United States Patent [19]

Kawula

[11] Patent Number: 4,937,820

[45] Date of Patent: Jun. 26, 1990

[54] METHOD AND APPARATUS FOR COMBINING DIRECT AND INDIRECT ADDRESSING SCHEMES TO MULTIPLEX FURTHER DATA WITH TRAFFIC DATA

[75] Inventor: Walter J. Kawula, Dallas, Tex.

[73] Assignee: Rockwell International Corporation, El Segundo, Calif.

[21] Appl. No.: 333,142

[22] Filed: Apr. 4, 1989

[51] Int. Cl.$^5$ ................................................ H04J 3/12
[52] U.S. Cl. .................................. 370/111; 370/110.1
[58] Field of Search ...................... 370/110.1, 111, 104

[56] References Cited

U.S. PATENT DOCUMENTS

| | | | |
|---|---|---|---|
| 4,330,858 | 5/1982 | Choquet | 370/111 |
| 4,507,781 | 3/1985 | Alvarez, III et al. | 370/104 |
| 4,750,165 | 6/1988 | Champagne et al. | 370/110.1 |

*Primary Examiner*—Douglas W. Olms
*Assistant Examiner*—Alpus H. Hsu

*Attorney, Agent, or Firm*—Bruce C. Lutz; V. Lawrence Sewell; H. Fredrick Hamann

[57] ABSTRACT

Typically time multiplexed switches use an indirect addressing scheme where a set of data bits in a first addressable memory define addresses in a second addressable memory as part of a read function to time switch an output data stream previously stored in the second memory. In a situation where there are less channels of traffic than there are potential addresses as defined by the number of bits stored in the first memory, the most significant bits can be used to define first and second ranges where the first range defines a set of data bits used for indirect addressing of traffic information and the second range can be used in a direct addressing mode to substitute the lesser significant bits of those stored in the first memory in place of traffic memory data bits when the stored most significant bits are detected to define the second range of data bits. Such an approach considerably simplifies the circuitry required to perform this additional multiplexing operation of signal data into the traffic data stream.

7 Claims, 1 Drawing Sheet

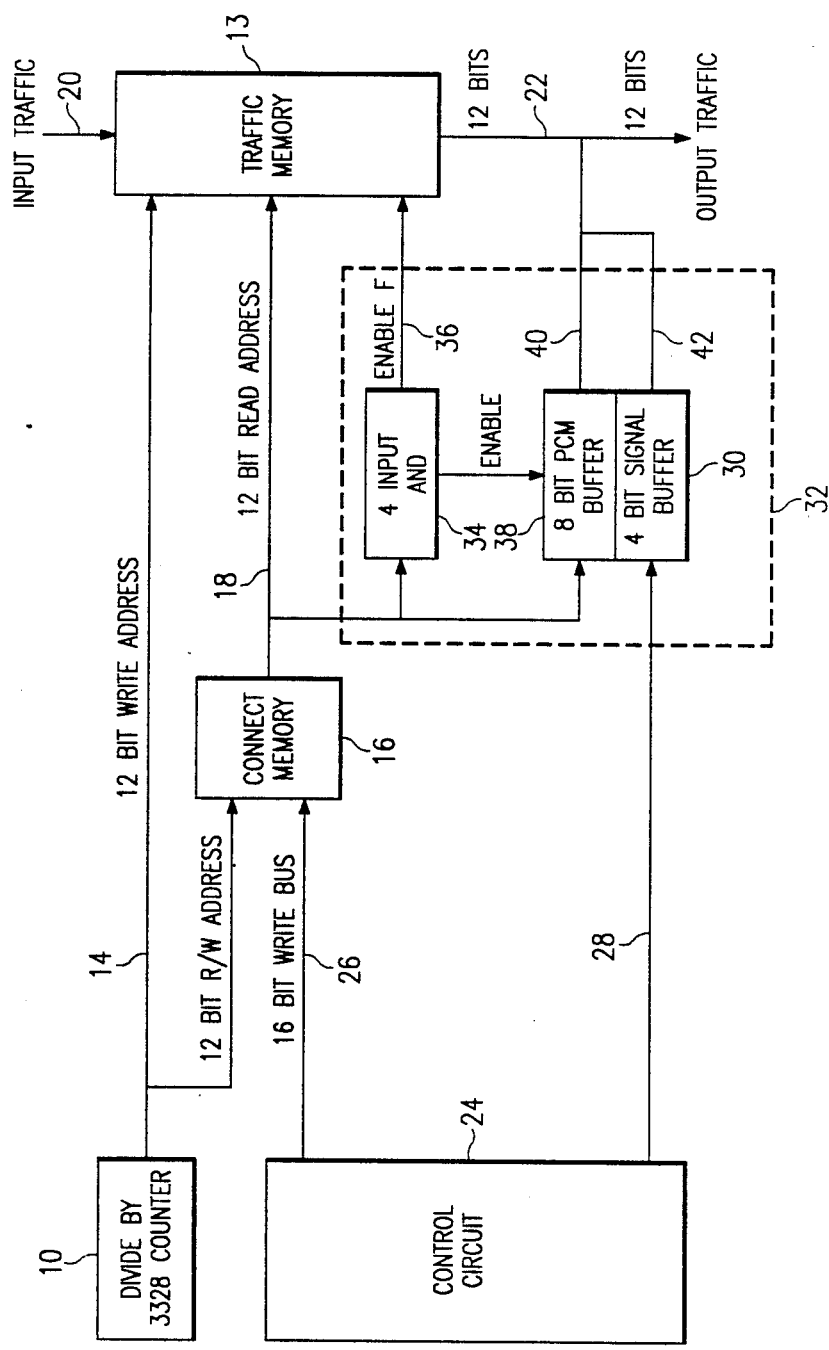

METHOD AND APPARATUS FOR COMBINING DIRECT AND INDIRECT ADDRESSING SCHEMES TO MULTIPLEX FURTHER DATA WITH TRAFFIC DATA

THE INVENTION

The present invention is generally directed to time multiplexing of data and more specifically to an approach of data transmission whereby it is desired to insert idle code, or other substitute data bit signaling, information into time slots typically used by traffic data in a time multiplexed data stream.

BACKGROUND

The prior art approach to accomplishing time multiplexing in a communication type data switch is to store information in a traffic memory on some kind of prescribed basis such as serial and then read the information out in a time multiplexed fashion using the ability inherent to random access memory. This has typically been accomplished by using a second memory which is serially accessed and the addressing information is stored in the second memory so that the data of the first memory or the traffic memory is indirectly addressed.

There are times when it is desired to insert substitute or signaling information such as idle code information into the time multiplexed traffic data. One way of accomplishing this is to use a two-to-one multiplex switch at either the input or the output of the traffic memory and have this switch alter, upon command, between the normal traffic and the idle code information. Such a switch requires considerable space and is not inexpensive. A second approach is to use a further idle code memory in addition to the traffic memory and provide indirect addressing to both the traffic memory and to the idle code memory as long as the indirect addressing scheme provides for more potential indirect addresses than there are channels of traffic.

The present invention focuses on the idetal that the normal indirect addressing scheme can be used for time multiplexing the traffic data where the indirect addressing scheme has a large enough potential set of addresses whereby the most significant bits of the addresses can define a first range to be used in connection with time multiplexing the traffic data and a second range can be detected in a direct addressing mode for inserting the bits, other than the most significant bits defining the range, into the traffic stream as a substitute for traffic data. Thus, the present approach changes or alters the normal indirect addressing scheme only, of the connect memory to traffic memory, to a scheme whereby this is used in addition to a direct addressing scheme of connect memory directly to the output bus for idle code or other signaling data to be used downstream by other system equipment. In one embodiment of the invention the first four bits of a 12 bit read address were used to define the hexidecimal range of addresses from 000 to CFF for use in indirect addressing of a time multiplexed switch and were also used to reserve the range of hexidecimal addresses of F00 to FFF for idle code traffic. Since this left the range from D00 to EFF as being unused, a further embodiment of the inventive concept has used one more range for a second set of signaling or substitute information.

As may be ascertained, this concept requires only the addition to the basic circuit of an AND gate detector and a buffer where the AND gate is used to disable traffic memory and enable the buffer to pass the output of the indirect memory storage means at an appropriate time directly to the output bus as a substitute for output information from the traffic memory. The cost and physical size of this additional hardware to accomplish the signaling data is inconsequential compared to the previously mentioned prior art approaches.

It is thus an object of the present invention to provide an improved approach to inserting substitute or signaling information into traffic data of a time multiplexed data stream.

Other objects and advantages of the present invention will be ascertained from a reading of the specification and appended claims in conjunction with the single block diagram drawing which illustrates a typical time multiplexed indirect addressing scheme with the additional components of the present invention enclosed in a dash line block.

DETAILED DESCRIPTION

In the single FIGURE a divide by 3,328 counter 10 is shown providing a 12 bit write address to a traffic memory block 13 on a bus lead 14. This same lead provides read and write addresses to a connect memory 16 which indirectly addresses the traffic memory 13 in a read mode via a further bus lead 18. The traffic memory 13 has input traffic data provided on a lead 20 and provides time multiplexed data on an output bus lead 22. A control circuit block 24 has a sixteen bit write bus providing information to the connect memory 16 on a lead 26 and provides four bits of signaling information via a bus lead 28 to a four bit signal buffer 30 within dash line block 32. Also within dash block 32 is a four bit AND gate 34 which is connected to lead 18 and provides a disable or enable F signal to traffic memory 13 on a lead 36. Finally, within block 32 is an eight bit PCM buffer 38 which is connected to receive the signals from connect memory on lead 18 and provide outputs on a bus lead 40 which comprises eight of the twelve bits of bus 22. The four bit signal buffer 30 privides four bits on a bus lead 42 which comprises the other four bits of the 12 bit bus 22.

Although for convenience of description, the traffic memory 13 has been illustrated as a single block, an actual embodiment of the invention uses two equal size banks (A and B) of traffic memory where band A is being written to at the time that bank B is being read from. On the next cycle, the first bank A is read from and the second one B is written to, and thus, the two banks are used on an alternating basis due to the time constraints involved in the reading and writing process. With less restrictive timing and frequency conditions, a single bank could be used.

OPERATION

In the typical operation of the prior art time multiplex switch, which would be the apparatus shown in the FIGURE with the exclusion of that contained within dash line block 32, the counter 10 provides a series of addresses from 0 to 3,327. The write memory locations in traffic memory 13 and the R/W (read/write) memory locations in connect memory 16 are accessed in a predetermined order which order will typically end up in the same order as the sequential channel number of the received serially multiplexed signal. The traffic memory receives input traffic being supplied on a 12 bit bus on lead 20 as part of a write operation. The connect memory 16 supplies read address information to the traffic memory except when the decoder within block 32 detects that the traffic memory read process should be disabled for a specific address. Typically, the information being provided by counter 10 to connect memory 16 is used to read addresses from the connect memory 16 to traffic memory 13 to to block 32. Whenever the control circuit wants to insert a new address in connect memory 16, the output of connect memory 16 is temporarily interrupted and a write operation occurs into connect memory 16 and at the same time, the write address is by-passed directly from lead 26 to lead 18 to direct that same address information to memory 13 (and block 32). Such convolutions are merely a specific implementation and many other approaches to the conceptual design are also usable.

Although one embodiment of the invention used a sixteen bit wide set of 4,096 memory locations, only twelve of these bits are used for the output read address and only 3,328 of the memory locations were used. The other bits are used for control purposes of the connect memory 16 and traffic memory 13 by leads not shown as they have no bearing on the inventive concept. The control circuit 24 is designed to place an address in connect memory 16 to perform the appropriate access of data from traffic memory 13 to the output 22 at a time appropriate to obtain time multiplexing. In other words, a multiplexed stream of data is input to traffic memory 13 with a given data channel time relationship and output in a manner to give a different time relationship due to the indirect addressing concept of the system.

Although the embodiment previously mentioned used 4,096 memory locations in connect memory 16, all of the locations over the 3,328 were merely wasted. If a connect memory could be easily purchased with only 3,328 while still having the necessary width of memory locations such as 16, such a connect memory would operate satisfactorily. In a 12 bit address, the four most significant binary bits may be used to define the hexidecimal code of 0 through F. Codes 0 through C will define a first range of 3,328 different addresses. If the AND gate 34 is designed to detect any of the unused code ranges D, E and F, the lesser significant bits one through eight of the 12 bit address can be supplied to buffer 38. Upon detection of the second range by 34, an enable signal can be supplied to buffer 38 while an enable F (false, a disabling signal) can be applied on lead 36 to traffic memory 13 so that at this time slot, the lesser significant bits from block 16 are output to the output traffic bus 22 via lead 40 rather than from traffic memory 13. At the same time, four additional idle code bits can be supplied from control circuit 24 through buffer 30 to the four most significant bit positions in the output traffic via lead 42 if more signaling bits are required than the initial eight lesser significant bits.

The present concept can be used for substituting information other than idle code information in any kind of time multiplexed data system. Thus, the information stored in connect memory 16 that have most significant bits defining the second range to be directly addressed and output on output lead 22 may more generally be defined as substitution code or signaling code rather than idle code.

In summary, the present invention accomplishes substitution of data into a time multiplexed traffic data bus by using indirect addressing for time multiplexing the input data and direct addressing where the direct addressing has most significant bits defining a range distinct from and separate from the range used for indirect addressing whereby the lesser significant bits of the direct address can be substituted into the time multiplexed output bus for traffic data.

While I have disclosed a single embodiment of the inventive concept, I wish to be limited not by the embodiment shown but only by the general inventive concept of using indirect and direct addressing within a single indirect addressing memory storage means to accomplish the substitution of data for traffic data in a time multiplexed data stream.

I claim:

1. Multiplexing apparatus comprising, in combination:

addressable memory switch first means, including traffic input means, traffic output means, write address input means, read address input means, and disable input means, for handling no greater than C channels of traffic;

apparatus signal input second means, connected to said traffic input means of said first means, for supplying traffic signals thereto for system time multiplexing;

write signal third means, connected to said write address input means, for supplying write signals to said first means whereby incoming traffic is stored in memory space in said first means as defined by said write signals;

read signal fourth means, including output means connected to said read address input means of said first means, for supplying R read addresses to output traffic from said first means at appropriate times, where R is greater than C;

address detection fifth means, including enable and disable means, connected between said output means of said fourth means and said disable input means of said first means, for preventing the output of any traffic from said first means when a given set of read addresses are detected; and buffer sixth means, connected to said output means of said fourth means, to said traffic output means of said first means, and to said enable means of said detection fifth means, for passing at least a portion of the read address received from said fourth means to said traffic output means when said given set of read addresses are detected by said fifth means thereby causing said sixth means to receive an enable signal, where C and R are integers greater than zero.

2. Apparatus comprising, in combination:

addressable memory switch first means, including traffic input means, traffic output means, write address input means, read address input means, and disable input means, for handling no greater than C channels of traffic;

apparatus signal input second means, connected to said traffic input means of said first means, for supplying traffic signals thereto for system time multiplexing;

write signal third means, connected to said write address input means, for supplying write signals to said first means whereby incoming traffic is stored in memory space in said first means as defined by said write signals;

read signal fourth means, including output means connected to said read address input means of said first means, for supplying R read addresses to output traffic from said first means at appropriate times, where R is greater than C;

address detection fifth means, including enable and disable means connected between said output means of said fourth means and said disable input means of said first means, for preventing the output of any traffic from said first means when a given set of read addresses are detected; and idle code traffic sixth means, connected to said output means of said fourth means, to said traffic output means of said first means, and to said detection fifth means, for outputting idle code information in accordance with read addresses received from said fourth means to said traffic output means when enabled due to said set of read addresses being detected by said fifth means, where C and R are integers greater than zero.

3. The method of substituting signaling information for normal customer traffic output from a write/read addressable switch comprising the steps of:

reserving a predetermined number of bit positions defining first and second ranges of address data in a set of read address bits, where the first range is used in an indirect addressing mode to read information from a write/read addressable switch, and the second range is used in a direct addressing mode whereby the bits, other than those reserved to define the range, are used for signaling information;

detecting the occurrence of the first or second range of addresses in said predetermined number of bit positions;

disabling the normal customer traffic output of said write/read addressable switch upon detection of the occurrence of said first range of data; and substituting signaling information in place of the customer traffic whenever the second range of addresses is detected.

4. The method of time multiplexing customer traffic and signaling information onto a data bus comprising, the steps of:

storing signaling information in less significant data bit positions of a first range of addresses of an indirect addressing memory storage means used in a time multiplexing system;

storing traffic memory addresses in said indirect addressing memory storage means for a second range of addresses distinct from said first range of addresses to be used in providing time multiplexing of traffic being supplied to a read/write traffic memory;

indirectly addressing said traffic memory through said indirect addressing memory storage means for transferring customer traffic from an input bus to an output bus when addresses supplied to said indirect addressing memory storage means results in an output in said second range of addresses; and substituting data contained in said less significant data bit positions for data bits in the output bus when addresses supplied to said indirect addressing memory storage means results in an output in said first range of addresses.

5. The method of time multiplexing customer traffic and signaling information onto a data bus comprising, the steps of:

storing sets of data bits, comprising a predetermined number of MSB (most significant bits) and remaining LSB (least significant bits), in addressable locations of an addressable first memory storage means where of the MSB stored defined first and second range of addresses;

addressing said first memory storage means to cause all the stored bits in the addressed locations to be output;

detecting whether the MSB of those output from said first memory storage means are in said first or second range of addresses;

supplying the output of said first memory storage means, as part of an indirect addressing scheme, to traffic memory means to output traffic data on a system output but in time multiplex format as compared to traffic data input to said traffic memory means when the detected MSB are in said first range of addresses; and supplying the output of said first memory storage means, as part of a direct addressing scheme, directly to said system output bus in place of the traffic data when the detected MSB are in said second range of addresses.

6. The method of multiplexing normal traffic data with signaling data in a time multiplexed switch system which uses N memory locations for user traffic data and has N+M potential indirect addresses available in the switch system comprising the steps of:

supplying addresses in a range of N to an indirect addressing memory storage means when user traffic is to be time multiplexed;

supplying system signaling data to said indirect addressing memory storage means where the LSB (least significant bits) stored in an addressable location define the signaling data and where the MSB (most significant bits) stored define a range of M addresses;

addressing said indirect memory storage means in a predetermined manner to output the data stored;

detecting the MSB of the data output by said indirect addressing memory storage means to determine whether the MSB of the stored data are in the range N or the range M;

writing user traffic data to an output bus when the MSB are detected to be in the range N as part of an indirect addressing scheme; and writing the stored signaling data directly to the output bus when the MSB thereof are detected to be in the range M, where N and M are integers greater than zero.

7. Time division multiplexing apparatus comprising, in combination:

addressable traffic memory switch first means, including traffic input means, traffic output means, write address input means, read address input means, and disable input means, for time multiplex handling no greater than C channels of traffic;

apparatus signal input second means, connected to said traffic input means of said first means, for supplying traffic signals thereto for system time multiplexing;

write signal third means, connected to said write address input means, for supplying write signals to said first means whereby incoming traffic is stored in memory space in said first means as defined by said write signals;

memory storage indirect addressing read signal fourth means, including output means connected to said read address input means of said first means, for supplying first and second ranges of said address data bits wherein the MSB (most significant bits) of the read address data bits define a first range which is at least as great as C and further where the LSB (least significant bits) of the second range of data bits provide traffic signaling information as part of a direct addressing scheme;

MSB address detection fifth means, including enable and disable means connected between said output means of said fourth means and said disable input means of said first means, for preventing the output of any traffic from said first means when a given set of read addresses in the first range are detected; and buffer sixth means, connected to said output means of said fourth means, to said traffic output means of said first means, and to said enable means of said detection fifth means, for passing at least the LSB portion of the data bits received from said fourth means to said traffic output means when said second range of MSB read address data bits are detected by said fifth means thereby causing said sixth means to receive an enable signal where C is an integer greater than zero.

* * * * *